United States Patent
Sabbatino et al.

(10) Patent No.: US 7,154,656 B2
(45) Date of Patent: Dec. 26, 2006

(54) RADIATION ABSORPTION IN ELECTRO-OPTICAL DEVICES

(75) Inventors: Salvatore Sabbatino, Turin (IT); Piero Gambini, Turin (IT); Cristiana Contardi, Turin (IT)

(73) Assignee: Avago Technologies Fiber IP (Singapore) Pte. Ltd. (SG)

( * ) Notice: Subject to any disclaimer, the term of this patent is extended or adjusted under 35 U.S.C. 154(b) by 0 days.

(21) Appl. No.: 11/049,171

(22) Filed: Feb. 2, 2005

(65) Prior Publication Data
US 2006/0171637 A1  Aug. 3, 2006

(51) Int. Cl.
G02F 1/07  (2006.01)

(52) U.S. Cl. ............... 359/253; 359/252; 455/117

(58) Field of Classification Search ............... 359/253, 359/252, 251, 246, 245, 242, 238; 455/117, 455/550.1, 90.1, 575.1
See application file for complete search history.

(56) References Cited

U.S. PATENT DOCUMENTS

2003/0066672 A1 * 4/2003 Watchko et al. ............... 174/50

* cited by examiner

Primary Examiner—Timothy Thompson

(57) ABSTRACT

Electro-optical apparatus includes a housing having at least one electrical subassembly (ESA) and at least one optical subassembly (OSA) therein as well as cavities within the housing and paths for transmitting electrical signals between the electrical and optical subassemblies. A glob top material is applied on at least a part of said paths, and hardened mass of a liquid electromagnetic absorber material at least partly fills the cavities in the housing. The hardened absorber material provides radiation absorption for the electro-optical apparatus and the glob top material protects the transmission paths from the absorber material, thereby avoiding undesired absorption of useful signals.

10 Claims, 1 Drawing Sheet

RADIATION ABSORPTION IN ELECTRO-OPTICAL DEVICES

FIELD OF THE INVENTION

The invention relates to radiation absorption in electro-optical devices, for use e.g. in optical communications.

DESCRIPTION OF THE RELATED ART

Present-day optical data communication systems such as e.g. fiberoptic communication systems use continuously increasing transmission bit-rates at 10 Gb/s and higher. At these transmission speeds/rates, the use of metallic leads to convey electrical signals between Optical Sub Assemblies (OSAs) and Electrical Sub Assemblies (ESAs) may adversely affect RF performance of any system including such subassemblies. This is particularly the case for fiberoptic transceivers where large volumes of data are aggregated into serial data streams at very high speeds, and these streams are eventually used to drive light sources such as e.g. laser sources.

The continuing demand for increased speeds of operation, reduced cost and small dimensions of the apparatus involved is the source of increased concern in terms of Electromagnetic Immunity (EMI) and Compatibility (EMC), crosstalk and signal integrity management.

Phenomena such as crosstalk and those phenomena that underlie issues in terms of EMI and EMC are mostly due to electromagnetic fields emitted from the high frequency paths in the transceiver, these problems being otherwise present also in other optoelectronic apparatus such as optical transmitters and receivers.

Today, a prevailing approach in reducing and controlling EMI and crosstalk problems is to use metallic or other solid shielding materials. These solutions are not particularly effective in terms of radiation absorption (EMC, EMI and crosstalk) and are hardly attractive at the manufacturing level as they are time expensive and difficult to apply in automated processes.

OBJECTS AND SUMMARY OF THE INVENTION

An object of the invention is to provide an absorber arrangement adapted for use in optical data communication systems. Such as e.g. fiberoptic communication systems such an arrangement is primarily intended to avoid that high bit rate electrical signals carried between Optical Sub Assemblies (OSAs) and Electrical Sub Assembly (ESAs) may adversely affect RF performance of any system including such subassemblies.

Another object of the invention is to provide an absorber arrangement adapted to cope with the continuing demand for increased speeds of operation, reduced cost and small dimensions of electro-optical apparatus while dispensing with any related concern in terms of Electromagnetic Immunity (EMI) and Compatibility (EMC), crosstalk and signal integrity management.

Specifically, an object of the present invention is to provide an absorber arrangement adapted to cope with phenomena such as crosstalk and critical issues in terms of EMI and EMC by virtually dispensing with electromagnetic fields emitted from the high frequency paths e.g. in a transceiver.

A further object of the invention is to provide an improved arrangement adapted to reduce and control EMI, EMC and crosstalk problems, while dispensing with the inherent difficulties related to the use metallic or other solid shielding materials.

Still a further object of the invention is to provide an improved arrangement that may be effective in terms of radiation absorption (EMC, EMI and crosstalk), without being time expensive and difficult to apply in automated processes.

The invention is defined by the claims that follow. A particularly preferred embodiment of the invention proposed here is based on the use of a liquid EMI absorber (i.e. Emerson&Cuming CRS-124). Such an EMI absorber is particularly effective in terms of radiation absorption and can be injected i.e. squeezed through an aperture/opening in the housing of apparatus such as e.g. a transceiver by means of a dispenser. Subsequently, the absorber material is cured, hardens and fits perfectly the internal parts of the transceiver.

The application of a liquid EMI absorber may turn out to be a critical process. Such a material may absorb the radiation at the working frequency within the apparatus where the absorber is applied. In order to avoid the undesired absorption of these "useful" signals, the RF paths in the apparatus (such as the connections between the OSAs and the ESA and the conductive tracks or strips on the ESA in a transceiver) are protected with a "glob top" material (i.e. Loctite Hysol E01062). The glob top material can be applied and cured before applying the absorber.

Advantageously, the use of an underfiller and/or the glob top material may help in avoiding undesired delamination problems in critical integrated circuits (Ics) which may be completely surrounded by—and thus embedded in—the liquid absorber.

BRIEF DESCRIPTION OF THE ANNEXED DRAWINGS

The invention will now be described, by way of example only, with reference to the annexed figures of drawing, wherein.

DETAILED DESCRIPTION OF THE BEST MODE OF CARRYING OUT THE INVENTION

Figure 1:
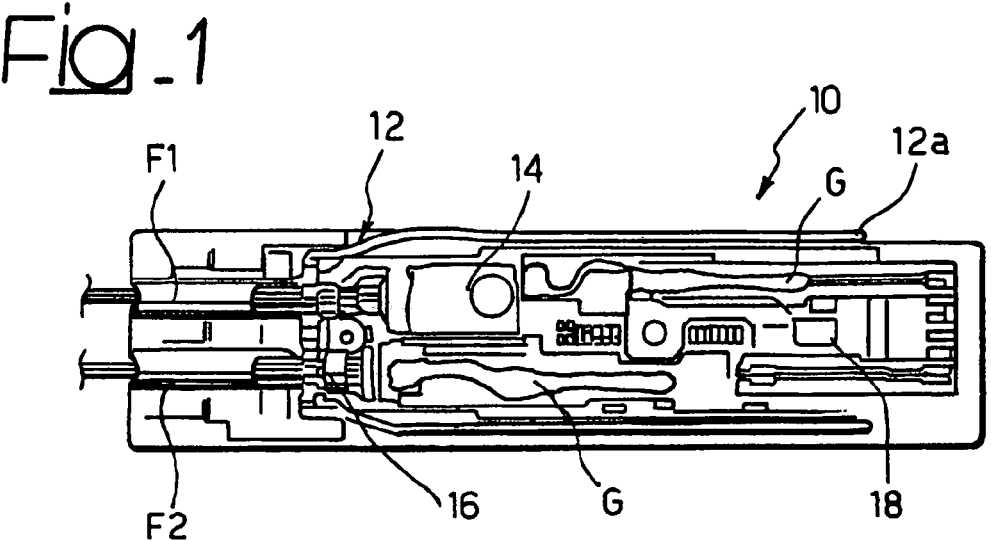
FIG. 1 is representative of an absorber arrangement as described herein.

The best mode of carrying out the invention currently known to the inventors will now be described in connection with electro optical apparatus comprised, in the exemplary embodiment shown, of a "transceiver" 10.

A transceiver is adapted to convert input electrical signals into corresponding output optical pulses adapted to be launched into an optical fiber (thus acting as a "transmitter"). The apparatus 10 is also adapted to convert input optical pulses received from an optical fiber into output electrical pulses (thus acting as a "receiver"). It will be easily appreciated that "transceiver" is simply a contracted form for transmitter/receiver.

A transceiver such as the transceiver 10 shown in the drawing typically includes a number of modules/assemblies arranged within a casing or housing 12. The casing 12 is usually comprised of two complementary half-shells 12*a* and 12*b* jointly defining a closed volume. This internal volume or chamber of the casing 12 houses two optical subassemblies (OSAs) 14 and 16 coming down to respective optical fiber connectors F1 and F2. The internal volume or chamber of the casing 12 also houses an electrical subassembly (ESA) 18. Electrical connecting paths in the form of metallic strips or tracks extend between the ESA 18 and the OSAs 14 and 16 as more generally explained in the introductory portion of the description.

While the invention is being disclosed in connection with a transceiver, those of skill in the art will promptly appreciate that the invention will identically apply e.g. to electro-optical components of different types such as e.g. fiberoptic transmitters or receivers. Similarly, it will be appreciated that terms such as "optical", "light", and the like are used herein with the meaning currently allotted to those terms in fibre and integrated optics, being thus intended to apply, in addition to visible light, also e.g. to radiation in the infrared and ultraviolet ranges.

The exemplary absorber arrangement described herein essentially addresses four main problems likely to arise in a transceiver such as the transceiver to, namely:

crosstalk ("X-talk") between the transmitter and receiver units;

Electro Magnetic Immunity (EMI) of the radiofrequency (RF) paths associated therewith;

Electro Magnetic Compatibility (EMC) of the transceiver; and reducing the amount of time required to assemble the transceiver.

Crosstalk is known to be primarily due to the electromagnetic field irradiated from the transmitter and picked up by the receiver and/or the electromagnetic field irradiated from the receiver and picked up by the transmitter. The main propagation path for crosstalk is air, i.e. the empty spaces or cavities within the casing 12.

The arrangement described herein uses an (electromagnetic) absorber material to fill the cavities within the transceiver casing 12. In that way, the electromagnetic emission underlying the crosstalk phenomena will be drastically reduced by the absorbing properties of the material and thus converted into thermal power, which is easily dissipated.

From the EMI/EMC point of view, the absorber material represents an effective way of increasing the electromagnetic immunity and compatibility of a transceiver such as the transceiver 10 shown in the drawings. In fact, electromagnetic emissions likely to be picked up by any equipment located nearby will be shielded by the external protections of the transceiver and possibly absorbed even within the transceiver itself. Any leakage of electromagnetic field from the transceiver module towards the surrounding environment is also drastically reduced as a result of a major portion of the emission being absorbed internally within the transceiver module.

Additionally, the use of an absorber material may be beneficial in decreasing manufacturing and assembly costs.

For instance, the arrangement described herein makes it possible to use housings at least partly comprised of a plastics material in the place of the metal housings currently in use today. Specifically, while certain parts of the casing 12 may still be comprised of metal in order to facilitate heat dissipation, the remaining portions of the casing may be made of a plastics material, since a fully satisfactory shielding effect is already provided by the absorber material.

A preferred embodiment of the invention is based on the use of a liquid EMI absorber. Exemplary of such an absorber is CRS-124 commercially available from Emerson & Cuming Microwave Products, Inc. of Randolph, Mass. Such an EMI absorber is particularly effective in terms of radiation absorption.

Figure 2:
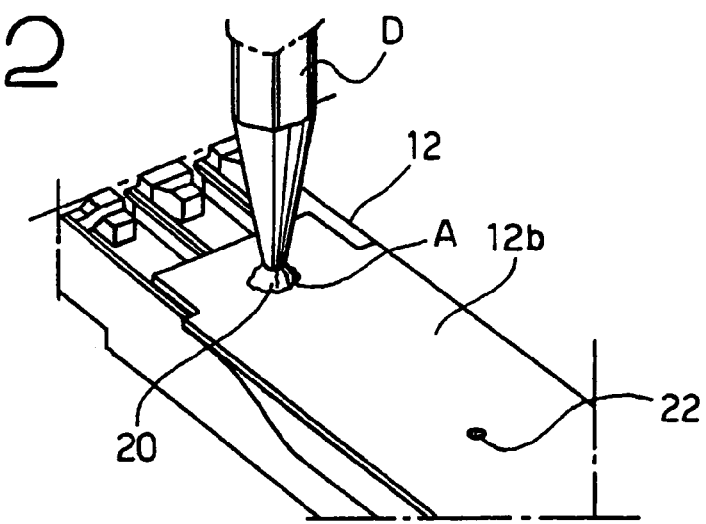
FIG. 2 is representative of a step in a method of providing an absorber arrangement as described herein.

As schematically shown in FIG. 2, a liquid EMI absorber can be easily injected i.e. squeezed into the transceiver from a dispenser D. More to the point, the liquid absorber A can be squeezed into the casing 12 of the transceiver 10 after this has been assembled.

The liquid absorber is introduced into the casing via one or more apertures/openings 20, 22 provided in the casing/housing 12 of the transceiver 10 or any other similar apparatus. The apertures/openings 20, 22 may alternatively play the role of injections sites for the absorber and vent openings to facilitate venting of air from the internal cavities of the transceiver housing while the cavities are being filled with the liquid absorber A delivered from the dispenser D and injected into the housing via another aperture.

Figure 3:
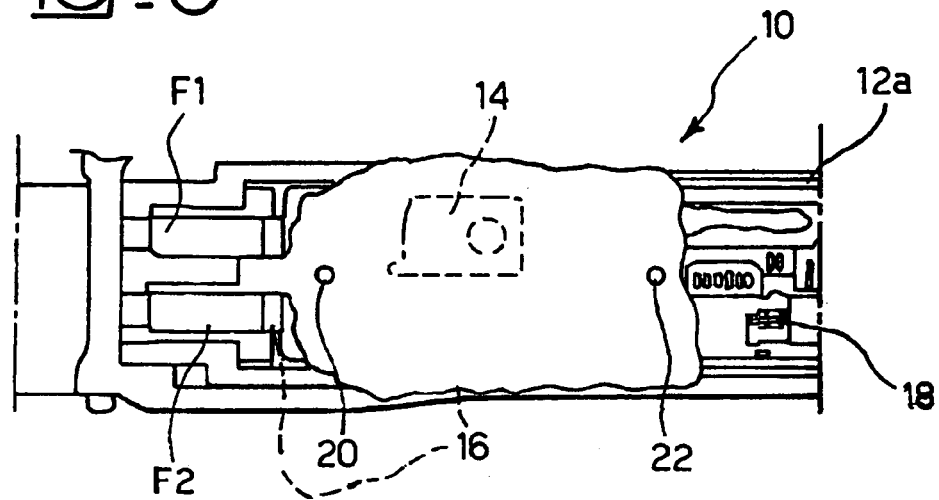
FIG. 3 is representative of the internal appearance of a transceiver provided with an absorber arrangement as described herein.

Subsequently, the absorber material A is cured (by known means e.g. by curing in an oven. Typically, the absorber type disclosed herein becomes solid after thermal curing at 85° C. for three hours or under different conditions as specified by the related datasheet. The cured absorber material hardens and fits perfectly the internal cavities of the transceiver 10 as schematically shown in FIG. 3.

That figure also shows that the cured absorber material A may also be helpful in protecting the transceiver against undesired/undetected access and tampering, thus ensuring increased security. The transceiver components are in fact "embedded" in the hardened absorber A. This makes access to and tampering with the components both more difficult and possibly more easy to detect.

From a manufacturing point of view, injecting the liquid absorber A into the casing/housing 12 is an easy and fast process. The absorber A can be simply "squeezed" into the casing of the transceiver already assembled. This may possibly occur by taking advantage of apertures 20, 22 that already exist in the casing for other purposes (e.g. the front screw holes of the housing of the assembled transceiver).

The amount of material dispensed can be precisely controlled e.g. by monitoring the weight of the transceiver assembly during the injection process of the absorber material.

While using an absorber material A is important to protect the RF paths, the application of a liquid EMI absorber may turn out to be a critical process. Such a material may in fact undesirably absorb the radiation at the working frequency within the apparatus where the absorber is applied.

In order to avoid an undesired absorption of "useful" signals, the RF paths in the apparatus (such as the connections between the OSAs and the ESA and the conductive tracks or strips on the ESA) are protected with a "glob top" material.

Exemplary of such a material is Hysol E01062 commercially available from Henkel Loctite Corp. of Rocky Hill, Conn.

As schematically shown in FIG. 1, the glob top material G (a material used extensively in the chip on board process) can be applied and cured before injecting the absorber. Specifically, the glob top material G is applied to protect e.g. the OSAs leads and the RF paths against the undesired absorption of "useful" signals at the apparatus operating frequencies by the absorber material A.

The foregoing detailed description of a presently preferred mode of carrying out the invention is provided for purposes of illustration and is not deemed to be limiting on the broader aspects of the present invention. The broader aspects of the present invention may be implemented using a variety of different approaches that are still consistent with the scope and content of the present invention. In this regard, the foregoing description is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

We claim:

1. A method of providing radiation absorption in apparatus including a housing having electrical components therein, said components defining cavities within said housing, the method including:
   injecting a liquid electromagnetic absorber material into said housing to thereby at least partly fill said cavities;
   hardening said absorber material at least partly filling said cavities, said hardened absorber material providing said radiation absorption;
   providing at least one opening in said housing; and
   injecting said liquid absorber material into said housing via said at least one opening.

2. The method of claim 1, including the steps of providing a plurality of openings in said housing and injecting said liquid absorber material into said housing via one opening of said plurality, wherein at least another opening of said plurality acts as a venting opening for gases expelled from said housing as a result of said liquid absorber material being injected into said housing.

3. The method of claim 1, including the steps of providing paths for transmitting electrical signals between said electrical components in said housing and applying a glob top material on at least a part of said paths to protect them from said absorber material.

4. The method of claim 3, wherein said glob top material is applied onto said paths before injecting said absorber material into said housing.

5. The method of claim 4, wherein said glob top material avoids delamination of the electrical components.

6. The method of claim 1, including the step of producing at least part of said housing of a plastic material.

7. A method of providing radiation absorption in electro-optical apparatus including a housing having at least one electrical subassembly and at least one optical subassembly therein as well as cavities within said housing and paths for transmitting electrical signals between said electrical and optical subassemblies, the method including the steps of:
   applying a glob top material on at least a part of said paths,
   injecting a liquid electromagnetic absorber material into said housing to thereby at least partly fill said cavities, and
   hardening said absorber material at least partly filling said cavities, said hardened absorber material providing said radiation absorption, wherein said glob top material protects said paths from said absorber material.

8. The method of claim 7, including the steps of providing at least one opening in said housing and injecting said liquid absorber material into said housing via said at least one opening.

9. The method of claim 8, including the steps of providing a plurality of openings in said housing and injecting said liquid absorber material into said housing via one opening of said plurality, wherein at least another opening of said plurality acts as a venting opening for gases expelled from said housing as a result of said liquid absorber material being injected into said housing.

10. The method of claim 7, including the step of producing at least part of said housing of a plastic material.

* * * * *